(12) United States Patent
Matsuura

(10) Patent No.: US 10,335,344 B2
(45) Date of Patent: Jul. 2, 2019

(54) MASSAGE APPLIANCE, MANUFACTURING METHOD THEREOF, AND MANUFACTURING APPARATUS

(71) Applicant: TENGA CO., LTD., Minato-ku, Tokyo (JP)

(72) Inventor: Tsutomu Matsuura, Tokyo (JP)

(73) Assignee: TENGA CO., LTD., Tokyo (JP)

( * ) Notice: Subject to any disclaimer, the term of this patent is extended or adjusted under 35 U.S.C. 154(b) by 734 days.

(21) Appl. No.: 14/761,267

(22) PCT Filed: Jan. 20, 2014

(86) PCT No.: PCT/JP2014/051021
§ 371 (c)(1),
(2) Date: Jul. 15, 2015

(87) PCT Pub. No.: WO2014/115691
PCT Pub. Date: Jul. 31, 2014

(65) Prior Publication Data
US 2015/0374578 A1 Dec. 31, 2015

(30) Foreign Application Priority Data
Jan. 22, 2013 (JP) .................................. 2013-009645

(51) Int. Cl.
*A61H 23/00* (2006.01)
*A61H 23/02* (2006.01)
(Continued)

(52) U.S. Cl.
CPC ......... *A61H 23/02* (2013.01); *A61H 23/0263* (2013.01); *B29C 39/10* (2013.01);
(Continued)

(58) Field of Classification Search
CPC ................ A61H 23/02; A61H 23/0263; A61H 2023/002; A61H 2201/0153;
(Continued)

(56) References Cited

U.S. PATENT DOCUMENTS 3,557,781 A * 1/1971 Kaye, Sr. ........... A61H 23/0263
601/71
5,344,437 A * 9/1994 Pistay ....................... A61F 7/10
5/639
(Continued)

FOREIGN PATENT DOCUMENTS

CN  102151219 A  8/2011
CN  102170606 A  8/2011
(Continued)

OTHER PUBLICATIONS

The State Intellectual Property Office of China, Official Action dated Jan. 4, 2016 in Chinese Patent Application No. 201480002977.5 with English translation, 12 pages.
(Continued)

*Primary Examiner* — Loan B Jimenez
*Assistant Examiner* — Shila Jalalzadeh Abyaneh
(74) *Attorney, Agent, or Firm* — Masuvalley & Partners

(57) ABSTRACT

Provided is a technology of a handy type and small-sized massage appliance. In the massage appliance, the vibrating section which is brought in contact with the user's skin and applies vibration is covered by the dual-structured cladding material having a high flexibility. Therefore, the original massage effect such as the promotion of bloodstream, the removal of the body wastes, and recovery from fatigue can be exerted without giving damage on a sensitive diseased part or the skin. There are provided a motor 5, a vibrating piece 8 which is rotatably driven by the motor, a vibrator body 2 which includes the case 9 accommodating these components, a soft cover 20 which surrounds the outer surface of the case, and a super-soft resin 40 which is interposed between the outer surface of the case and the soft cover and integrates the case and the soft cover.

5 Claims, 8 Drawing Sheets

(51) Int. Cl.
  *B29C 39/10* (2006.01)
  *B29C 39/12* (2006.01)
  *B29C 45/14* (2006.01)
  *B29L 9/00* (2006.01)
  *B29K 75/00* (2006.01)
  *B29K 683/00* (2006.01)

(52) U.S. Cl.
  CPC ...... *B29C 39/126* (2013.01); *B29C 45/14811* (2013.01); *A61H 2023/002* (2013.01); *A61H 2201/0153* (2013.01); *B29C 2791/006* (2013.01); *B29K 2075/00* (2013.01); *B29K 2683/00* (2013.01); *B29L 2009/005* (2013.01)

(58) Field of Classification Search
  CPC . B29C 39/126; B29C 39/10; B29C 45/14811; B29C 2791/006; B29C 45/14467; B29C 2045/1454; B29C 2045/14967; B29K 2683/00; B29K 2075/00; B29L 2009/005; B29L 2031/753; B29V 45/14811; B32B 27/00
  USPC ............... 264/261, 263, 267, 272, 272.2
  See application file for complete search history.

(56) References Cited

U.S. PATENT DOCUMENTS

| | | | |
|---|---|---|---|
| 7,481,957 B1* | 1/2009 | Adickes | B32B 17/10036 264/241 |
| 2003/0060742 A1* | 3/2003 | Lee | A61H 23/0263 601/70 |
| 2003/0135135 A1 | 7/2003 | Miwa et al. | |
| 2011/0124959 A1* | 5/2011 | Murison | A61H 19/34 600/38 |

FOREIGN PATENT DOCUMENTS

| | | |
|---|---|---|
| CN | 202859074 U | 4/2013 |
| JP | S55-5148 Y2 | 2/1980 |
| JP | 60-32932 U | 3/1985 |
| JP | 1-43068 Y2 | 12/1989 |
| JP | H04-297260 A | 10/1992 |
| JP | 5-229290 A | 9/1993 |
| JP | 2938210 B2 | 8/1999 |
| JP | 2003-70866 A | 3/2003 |
| JP | 2004-358088 A | 12/2004 |
| JP | 2005-288079 A | 10/2005 |
| JP | 3710102 B2 | 10/2005 |
| JP | 2008-523850 A | 7/2008 |
| JP | 2008-264031 A | 11/2008 |
| JP | 2009-542274 A | 12/2009 |
| JP | 2010-088588 A | 4/2010 |
| JP | 2011-245750 A | 12/2011 |
| WO | WO2006/063461 A1 | 6/2006 |
| WO | WO2008/003969 A1 | 1/2008 |

OTHER PUBLICATIONS

EPO, Extended European Search Report dated Jul. 6, 2016 in the EP Patent Application No. 14743460.9 (corresponding to PCT/JP2014/051021), total 11 pages.
WIPO, International Preliminary Examining Authority (Japanese Patent Office), International Preliminary Report on Patentability dated Aug. 6, 2015 in International Patent Application No. PCT/JP2014/051021, 7 pages.
WIPO, Japanese International Search Authority, International Search Report dated Feb. 10, 2014 in International Patent Application No. PCT/JP2014/051021, 3 pages.
EPO (Schut, Timen, Primary Examiner), Official Action dated Apr. 19, 2018 in European Patent Application No. 14 743 460.9, 4 pages.

* cited by examiner

[ Fig. 1(a) ]
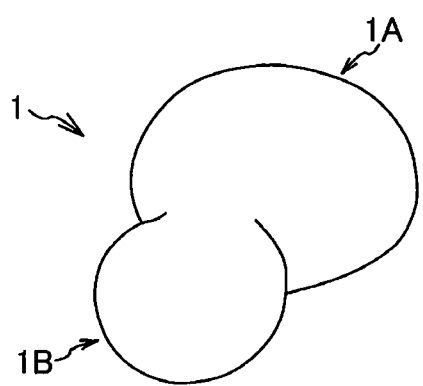
[ Fig. 1(b) ]
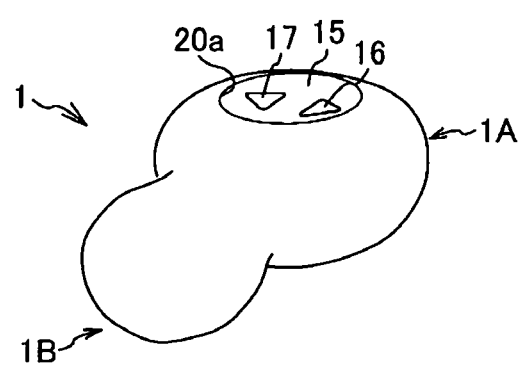

[ Fig. 2(c) ] Top plan view
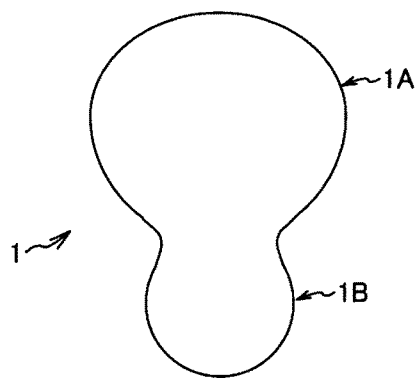
[ Fig. 2(b) ] Left side view
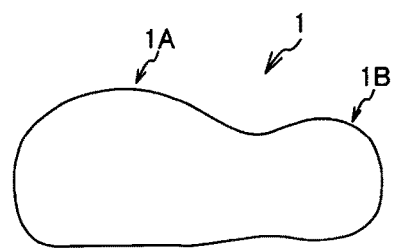
[ Fig. 2(a) ] Front view
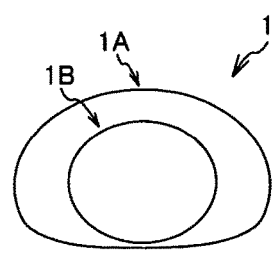
[ Fig. 2(d) ] Bottom plan view
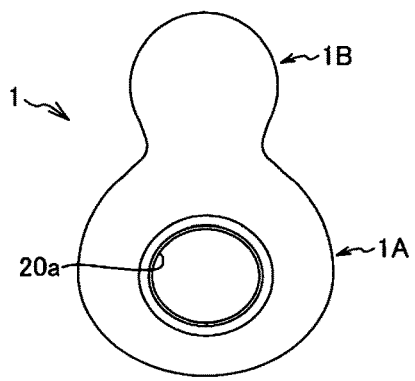

[ Fig. 3(a) ]
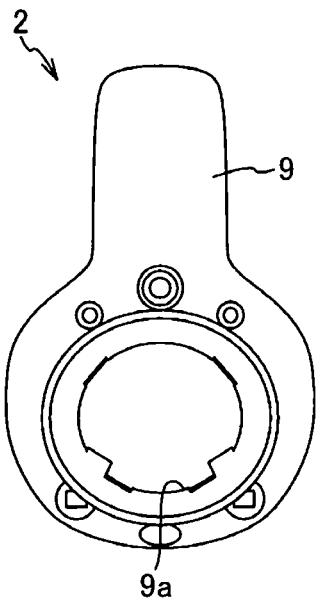
[ Fig. 3(b) ]
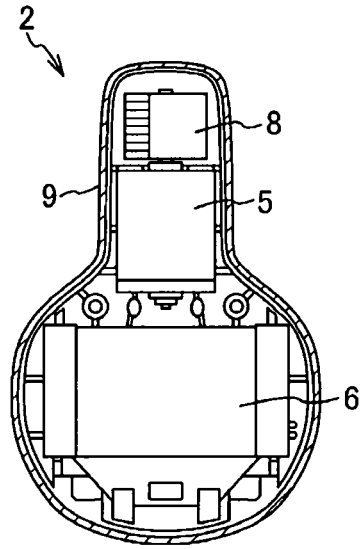
[ Fig. 4(a) ]
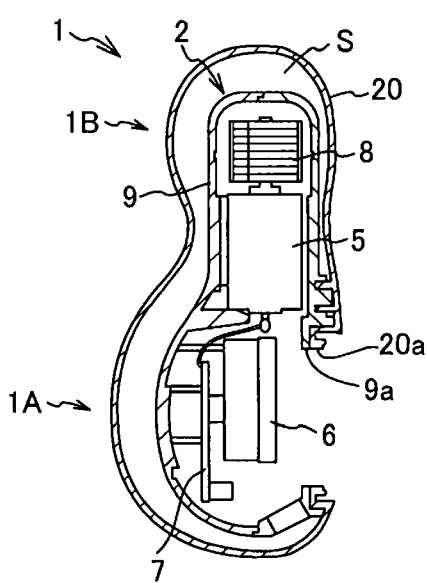
[ Fig. 4(b) ]
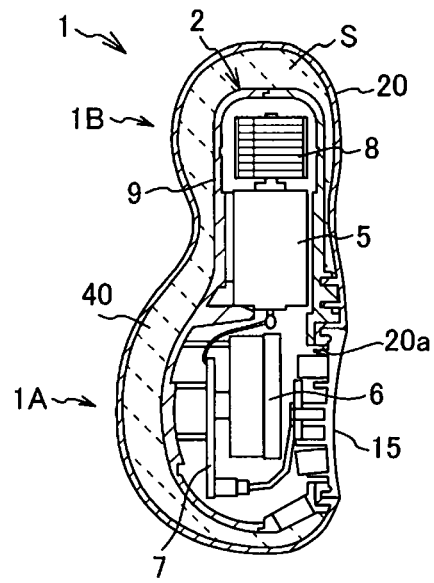

[Fig. 5(a)]
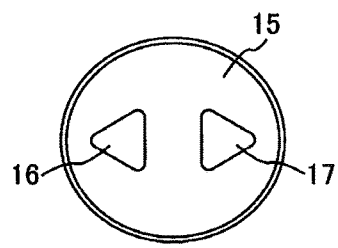
[Fig. 5(b)]
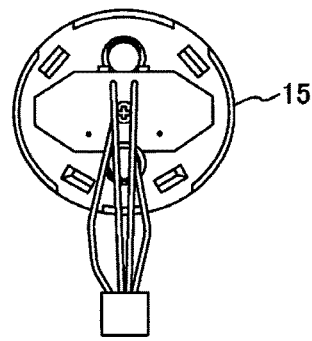
[Fig. 6(a)]
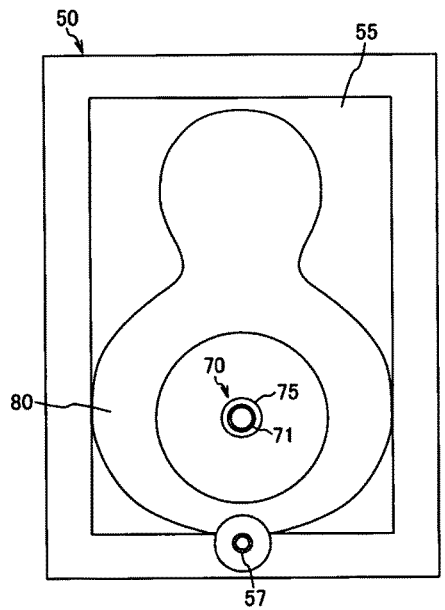
[Fig. 6(b)]
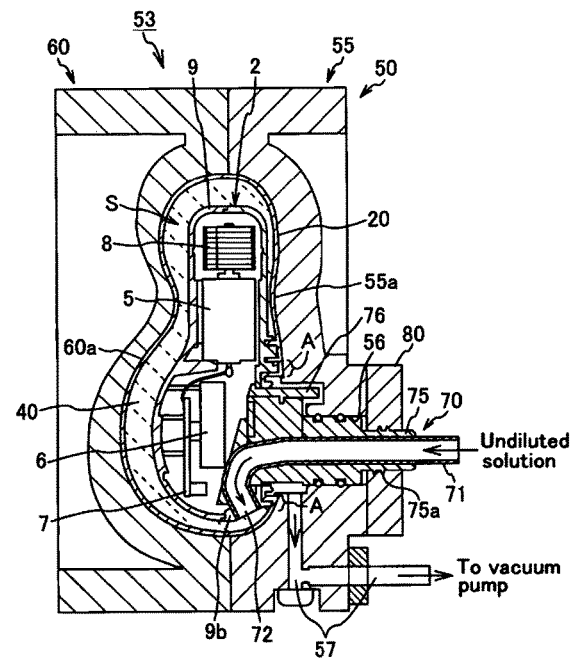

[Fig. 7(a)]
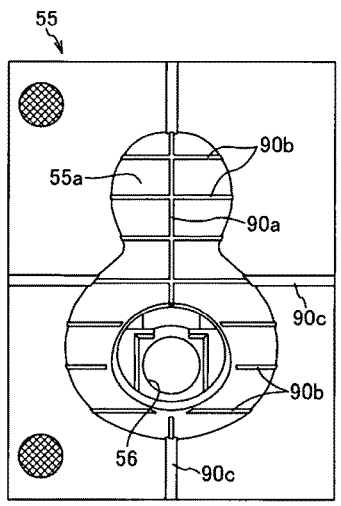
[Fig. 7(b)]
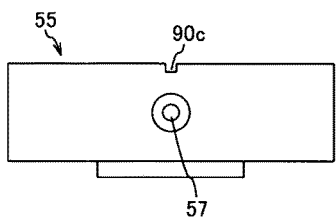
[Fig. 7(c)]
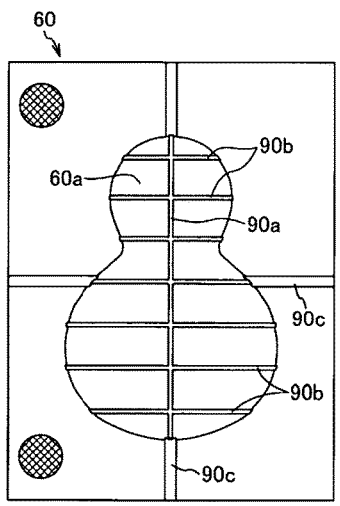
[Fig. 7(d)]
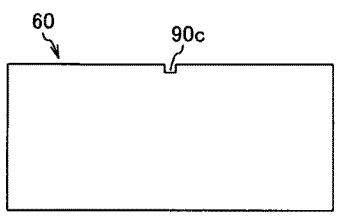
[Fig. 7(e)]
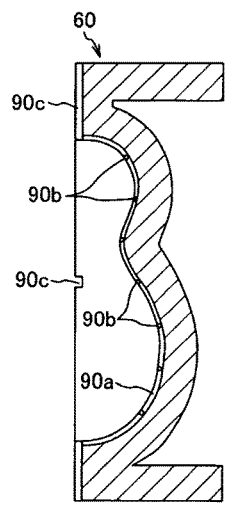
[Fig. 8]
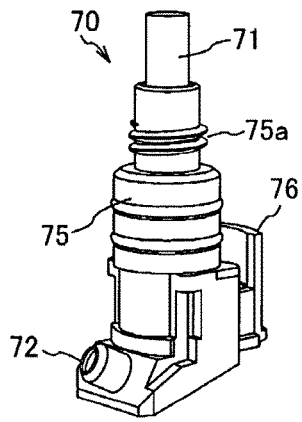

[Fig.9]
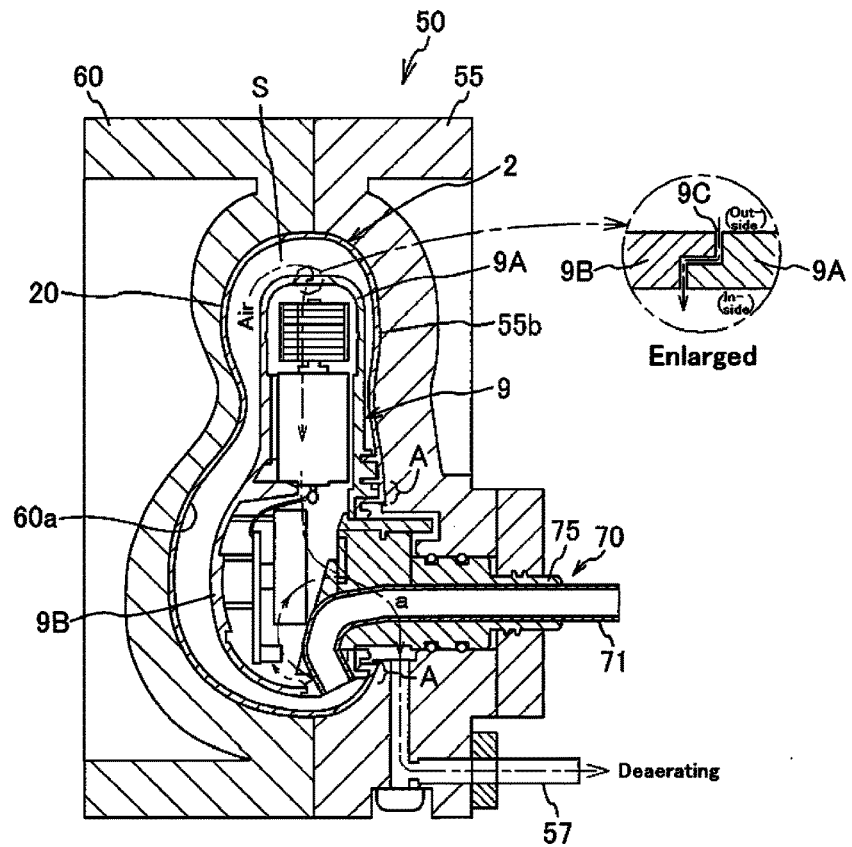
[Fig. 10(a)]
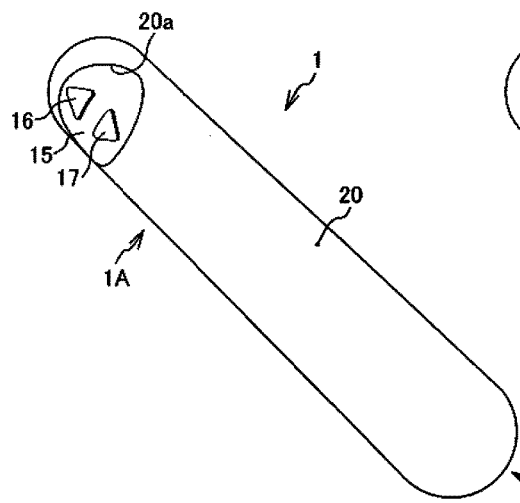
[Fig. 10(b)]
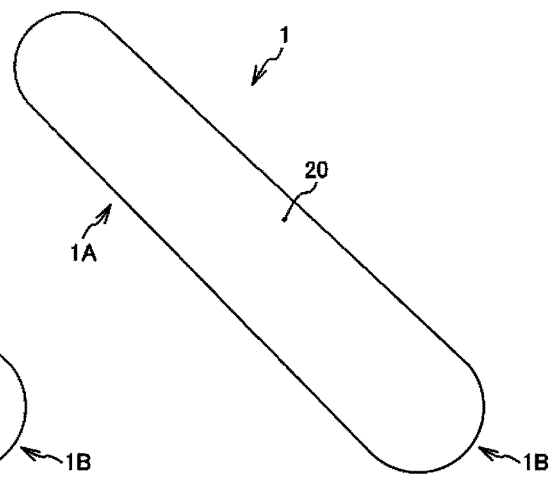

[Fig. 11(a)]
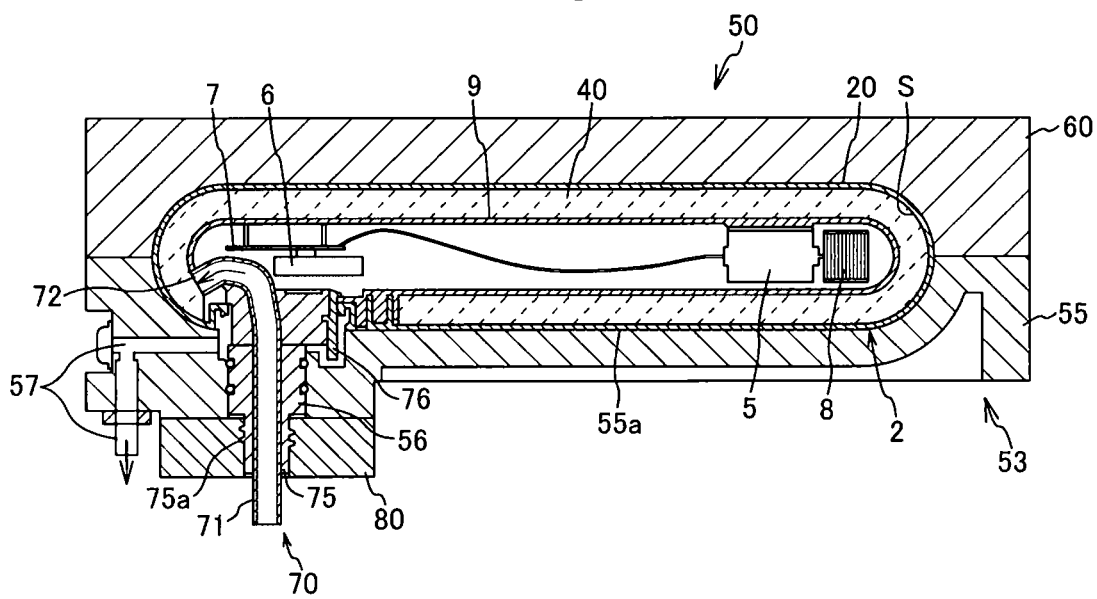
[Fig. 11(b)]
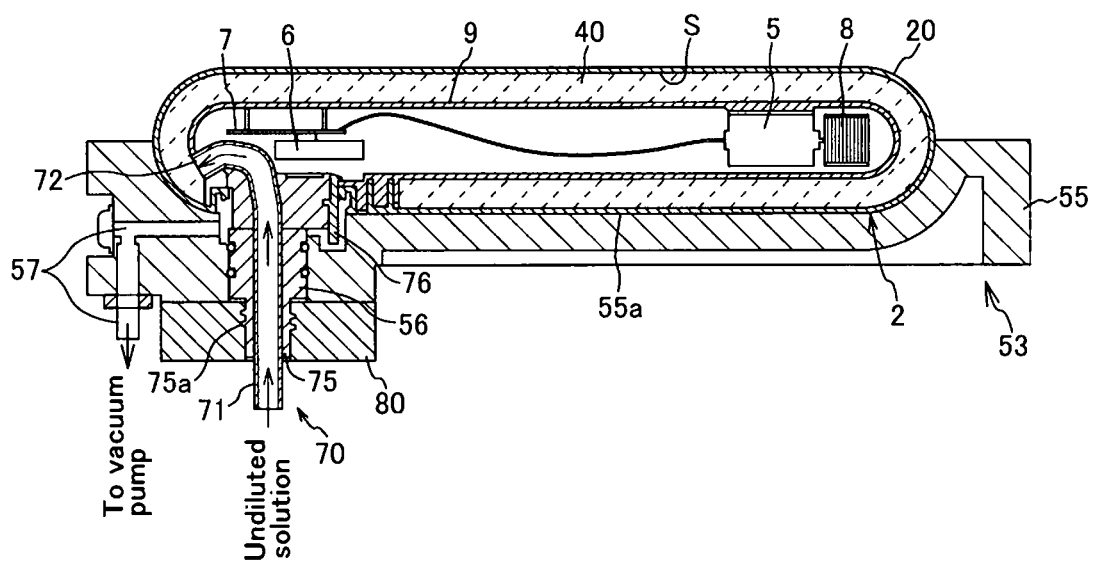

[Fig.12]
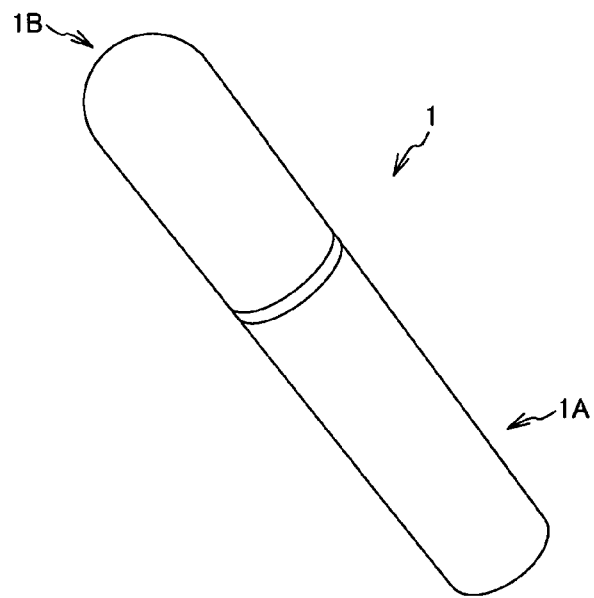
[Fig. 13(a)]
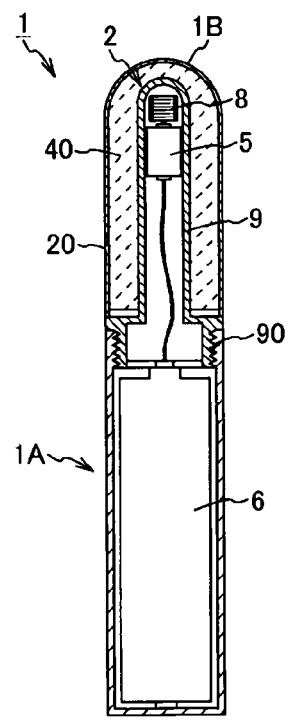
[Fig. 13(b)]
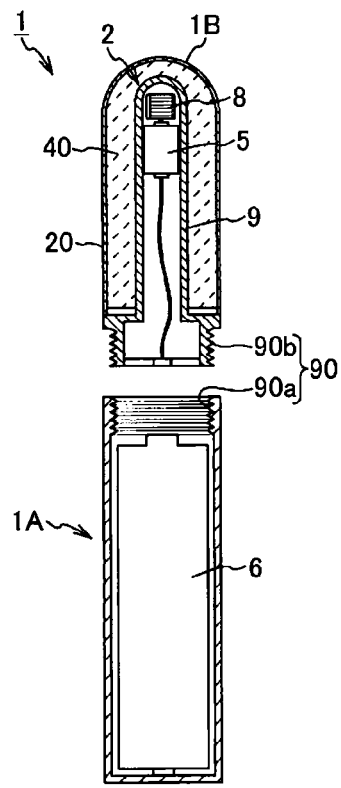

MASSAGE APPLIANCE, MANUFACTURING METHOD THEREOF, AND MANUFACTURING APPARATUS

RELATED APPLICATIONS

This application is the U.S. National Phase of and claims priority to International Patent Application No. PCT/JP2014/051021, International Filing Date Jan. 20, 2014, entitled Massager, And Production Method And Production Device For Same, which claims benefit of Japanese Patent Application No. JP2013-009645 filed Jan. 22, 2013; both of which are incorporated herein by reference in their entireties.

TECHNICAL FIELD

The present invention relates to a small-sized massage appliance, a manufacturing method thereof, and a manufacturing apparatus, which are suitable for locally massaging a face, a head, a cervical portion, and other sensitive body parts and can exert a soft contact feeling and a promotion effect of bloodstream.

BACKGROUND ART

There is proposed various small-sized massage appliances which are reduced in size as small as possible to be held in one hand and locally stimulates a body part such as an acupressure point by the vibration of a vibrating motor in order to promote bloodstream and remove body wastes (Patent Literature 1, Patent Literature 2, and Patent Literature 3).

However, even in any massage appliance, resin or rubber having a bad smooth touch property with respect to the skin is used as a material of a vibrating section which comes in contact with a skin, and contact and pressure for a long time cause pain in the skin, and as a result provides a factor causing an uncomfortable feeling.

In other words, the massage appliance in the related art fails to employ a configuration in which the contact feeling between the vibrating section and the skin is sufficiently considered. Therefore, the massage appliance is unsuitable for those who have a delicate skin and for a means for massaging a face portion (such as an eye, an ear, and a temple), a cervical portion, and a sensitive body portion.

In addition, in the small massage appliance of the related art, since the sliding with respect to fingers for a touch feeling in a portion grasped by a user is degraded and a material selection is not suitable, a tired feeling and a discomfort feeling are caused when the massage is continuously performed for a long time.

In addition, vibrating sounds of the massage appliance in the related arts grate on user's ears, and the fingers are numbed due to the continuous vibration in use.

CITATION LIST

Patent Literature

Patent Literature 1: Japanese Patent Application Laid-Open No. 2004-358088
Patent Literature 2: Japanese Patent Application Laid-Open No. 2008-264031
Patent Literature 3: Japanese Patent Application Laid-Open No. 2010-88558

SUMMARY OF INVENTION

Technical Problem

An object of the present invention is to provide a technology of a handy-type and small-sized massage appliance in which the original massage effect such as the promotion of bloodstream, the removal of the body wastes, recovery from fatigue can be exerted without giving damage on a sensitive diseased part or the skin by covering the vibrating section which is brought in contact with the user's skin and applies vibration with the dual-structured cladding material having flexibility.

In addition, by covering not only the vibrating section but also the entire apparatus with the dual-structured cladding material having flexibility, the sliding of user's fingers and touch feeling are enhanced, a use feeling is kept without a tired feeling, finger's numbness, and an discomfort feeling, and a vibrating sound can be damped.

Solution to Problem

In order to achieve the above object, there is provided a massage appliance described in the invention according to first aspect which includes a motor, a vibrating piece configured to be driven by the motor, a case configured to accommodate the motor and the vibrating piece, and a soft cover configured to surround at least a part of an outer surface of the case. Further, a super-soft resin (super flexible resin) is interposed between the outer surface of the case and the soft cover.

The super-soft resin is a material which is significantly flexible compared to the soft cover.

An invention according to a second aspect is the manufacturing method of the massage appliance according to the first aspect, including: accommodating the motor and the vibrating piece in the case; preparing a soft cover which includes a cover opening at a position corresponding to the case opening; coating the soft cover on the outer surface of the case to make the case opening communicate with the cover opening; forming a space between the outer surface of the case and an inner surface of the soft cover by tightly fixing a peripheral edge of the cover opening over the entire peripheral of a peripheral edge of the case opening; introducing a negative pressure into the space; injecting a liquid resin as an undiluted solution of the super-soft resin into the space; and curing the liquid resin to be the super-soft resin.

An invention according to a third aspect is the manufacturing method of the massage appliance according to the first aspect, including: accommodating the motor and the vibrating piece in the case; preparing a soft cover which includes a cover opening at a position corresponding to the case opening; coating the soft cover on the outer surface of the case to make the case opening communicate with the cover opening; forming a space between the outer surface of the case and an inner surface of the soft cover by tightly fixing a peripheral edge of the cover opening over the entire peripheral of a peripheral edge of the case opening; injecting a liquid resin as an undiluted solution of the super-soft resin into the space; and curing the liquid resin to be the super-soft resin.

An invention according to a fourth aspect is the manufacturing method of the massage appliance according to the first aspect, including: preparing a soft cover which includes a cover opening at a position corresponding to the case opening; coating the soft cover on the outer surface of the case to make the case opening communicate with the cover opening; forming a space between the outer surface of the case and an inner surface of the soft cover by tightly fixing a peripheral edge of the cover opening over the entire peripheral of a peripheral edge of the case opening; injecting a liquid resin as an undiluted solution of the super-soft resin into the space; curing the liquid resin to be the super-soft resin; and accommodating the motor and the vibrating piece in the case.

The motor and the vibrating piece may be accommodated in the case at the final stage.

An invention according to a fifth aspect is the manufacturing method of the massage appliance according to the second aspect, including: a molding member configured to hold the case coated with the soft cover, be made of at least one molding piece, and include a molding member opening communicating with the respective openings in the molding piece; an injection device of which the front portion is inserted and attached to the case opening through the molding member opening and the cover opening and the rear portion is positioned outside the molding member; a fastening device configured to fix the rear portion of the injection device to the molding member and tightly fix a peripheral edge of the cover opening over the entire peripheral of the peripheral edge of the case opening; and a negative pressure introducing section configured to be formed to pass through the molding member and communicate with a space between the outer surface of the case and the inner surface of the soft cover, wherein a resin injecting section is provided in a front portion of the injection device to communicate with the space.

The molding piece does not necessarily surround or hold the entire soft cover, but may hold a part thereof.

An invention according to a sixth aspect is the manufacturing method of the massage appliance, wherein the injection device includes an injection empty space which is used to inject the super-soft resin into the space and a positioning member which includes the injection empty space.

Advantageous Effects of Invention

According to the present invention, in a handy type and small-sized massage appliance of the invention, the original massage effect such as the promotion of bloodstream, the removal of the body wastes, recovery from fatigue can be exerted without giving damage on a sensitive diseased part or the skin by covering the vibrating section which is brought in contact with the user's skin and applies vibration with the dual-structured cladding material having a high flexibility.

In addition, by covering not only the vibrating section but also the entire apparatus with the dual-structured cladding material having a high flexibility, the sliding of user's fingers is enhanced to keep a use feeling without a discomfort feeling.

BRIEF DESCRIPTION OF DRAWINGS

FIGS. 1(a) and 1(b) are a front side perspective view and a bottom side perspective view illustrating an example of a massage appliance of the present invention.

FIGS. 2(a), 2(b), 2(c), and 2(d) are a front view, a left side view, a top plan view, and a bottom plan view of the massage appliance, respectively.

FIGS. 3(a) and 3(b) are a bottom plan view and a transverse sectional view of a case.

FIG. 4(a) is a longitudinal sectional view illustrating a side portion of the massage appliance which is not filled with a super-soft resin, and FIG. 4(b) is a longitudinal sectional view illustrating a side portion of the massage appliance in a state where the super-soft resin is filled.

FIGS. 5(a) and 5(b) are an outer surface view and an inner surface view of a lid body.

FIGS. 6(a) and 6(b) are a front view and a longitudinal sectional view illustrating a manufacturing apparatus for implementing a manufacturing method of the massage appliance of the present invention.

FIGS. 7(a) and 7(b) are an inner surface view and a bottom plan view of one metal mold piece, and FIGS. 7(c), 7(d), and 7(e) are an inner surface view, a bottom plan view, and a longitudinal sectional view of the other metal mold piece.

FIG. 8 is a diagram for describing a configuration of an exemplary injection device.

FIG. 9 is a cross-sectional view for describing an air flow when deaerating is performed.

FIG. 10 is a perspective view illustrating the outer appearance of the massage appliance according to another embodiment of the present invention, in which (a) is a front side perspective view and (b) is a perspective view illustrating the rear surface side.

FIGS. 11 (a) and 11 (b) are cross-sectional views illustrating a configuration of an apparatus to manufacture the massage appliance according to the embodiment.

FIG. 12 is a perspective view illustrating the outer appearance of the massage appliance according to the embodiment.

FIGS. 13(a) and 13(b) are a longitudinal sectional view and an exploded sectional view of the massage appliance.

DESCRIPTION OF EMBODIMENTS

Hereinafter, embodiments of the present invention will be described in detail with reference to the drawings.

Embodiment of Massage Appliance

FIGS. 1(a) and 1(b) are a front side perspective view and a bottom side perspective view illustrating an example of a massage appliance of the present invention, and FIGS. 2(a), 2(b), 2(c), and 2(d) are a front view, a left side view, a top plan view, and a bottom plan view of the massage appliance, respectively. In addition, FIGS. 3(a) and 3(b) are a bottom plan view and a transverse sectional view of a case, FIG. 4(a) is a longitudinal sectional view illustrating a side portion of the massage appliance which is not filled with a super-soft resin, and FIG. 4(b) is a longitudinal sectional view illustrating a side portion of the massage appliance in a state where the super-soft resin is filled. In addition, FIGS. 5(a) and 5(b) are an outer surface view and an inner surface view of a lid body.

A massage appliance 1 includes a vibrator body 2, a silicone rubber cover (a soft cover) 20 which surrounds the outer surface of the case 9, and a super-soft resin (for example, a urethane super-soft resin, a gel-like resin, and the like) 40 interposed between the outer surface of the case and the silicone rubber cover. The vibrator body 2 includes a motor 5, a battery 6, a printed-circuit board 7 on which a control circuit of the motor is mounted, a vibrating piece 8 which is rotatably driven by the motor, and the case 9 which contains these inner components.

An opening 9a is formed in the bottom surface of the case 9 made of a plastic material, a peripheral edge portion (a seal portion A) of an opening 20a of the silicone rubber cover (hereinafter, referred to as a cover) 20 is tightly fixed to a peripheral edge outside the opening 9a. With this configuration, airtightness of a space S between the outer surface of the case and the inner surface of the cover is secured. The space S is filled with a super-soft resin 40.

Further, the airtightness in the space S is preferably the airtightness in the strict sense. However, the airtightness in the strict sense is not an essential condition, and the undiluted solution can evenly fill the space of a loose airtightness by studying a method of injecting an undiluted solution of the super-soft resin, a method of pressing the silicone rubber cover, or the like.

The openings 9a and 20a are closed by a lid member 15.

Two operation switches 16 and 17 are provided in the outer surface of the lid member 15, and power from the battery 6 to the motor 5 and the control circuit can be turned on/off, or modes of driving the motor can be switched by depressing the operation switches with a finger. In addition, the operation switches also serve as charging terminals, and a charging operation can be performed on the battery 6 by bring the respective operation switches in contact with the charging terminals of a battery charger (not illustrated).

The massage appliance 1 according to this example includes a grasping section 1A which is grasped by fingers and a vibrating section 1B which comes in contact with a local portion such as an acupressure point of a body and applies vibrations from the vibrating piece 8.

Further, the entire configuration of the massage appliance 1 may be modified in various forms, and the configuration example in the drawing is given as merely exemplary.

Silicone rubber for forming a cover 20 is a material having a low frictional resistance and a high flexibility. It is possible to significantly increase a cushioning property of the outer surface of the massage appliance by filling a space between the cover 20 and the plastic case 9 with the super-soft resin 40 as a buffer material. As a result, when vibrations are applied to body's local portion such as the acupressure point and a stiff portion, a massage effect (promotion of bloodstream, removal of body wastes, and the like) can be improved without any damage or pain in the body's local portion.

As the super-soft resin 40, for example, a material having a high flexibility (low repulsion property) such as a gel-like elastomer and a soft urethane is used. The super-soft resin 40 has flexibility significantly higher than a silicone rubber used as a material of the cover 20. Therefore, it is possible to give characteristics such as a low frictional resistance and a super flexibility to a cladding material of the massage appliance by providing the super-soft resin having flexibility significantly higher than the cover in an epidermis of the cover having a characteristic such as a low frictional resistance.

In other words, in the massage appliance of the present invention, the high flexibility and the cushioning property are secured with the silicone rubber which is low in frictional resistance and has a low flexibility and the super-soft resin which has the flexibility and the cushioning property still more than the silicone rubber in cooperation with each other, and a pressure to be concentrated on the local portion can be dispersed. Therefore, it is possible to provide a massage appliance having a high stability suitable to the stimulation of a person having a delicate skin and a sensitive body part (for example, face parts such as an eye and the surrounding thereof, an ear, a nose, and a temple; an acupressure point of a head; a cervical portion; a painful body part due to blood stagnation; and a stiff body part) without any pain in the skin even when the local portion is stimulated for a long time.

In addition, with the configurations of the cover 20, the buffering of the super-soft resin 40, and a sound attenuating operation, it is possible to reduce noises from the vibrating piece 8 rotatably driven by the motor. Furthermore, it is possible to alleviate a problem that user's fingers are numbed.

Further, in this example, the super-soft resin 40 integrates the case and the silicone rubber cover, but there is no need to integrate the case and the super-soft resin. Since sliding with respect to the case is suppressed by the frictional resistance of the super-soft resin, it is possible to prevent positional deviation and separation.

While depending on a shape of the case, the soft cover 20 which is provided with the super-soft resin layer in the inner surface may be coated in the outer surface of the case.

Further, it is not necessarily to form the soft cover in one layer structure, and a plurality of layers may be provided.

Embodiment of Manufacturing Apparatus of Massage Appliance

Next, FIGS. 6(a) and 6(b) are a front view and a longitudinal sectional view illustrating a manufacturing apparatus for implementing a manufacturing method of the massage appliance of the present invention.

A manufacturing apparatus 50 of the massage appliance includes a metal mold (a molding member) 53 which accommodates or holds the vibrator body 2 coated with the silicone rubber cover 20, is configured by two metal mold pieces (molding pieces) 55 and 60, and includes a metal mold opening (a molding member opening) 56 in communication with the respective openings 9a and 20a in the metal mold piece 55, an injection device 70 of which the front portion is inserted and attached to a case opening 9a through the metal mold opening 56 and a cover opening 20a and the rear portion is positioned on the outside of the metal mold, a fastening device 80 which fixes the rear portion of the injection device 70 to the metal mold piece 55 and comes in airtightly close contact over the entire peripheral edge of the case opening 9a with the peripheral edge of the cover opening 20a, and a negative pressure introducing section 57 which is penetrated and formed on any one of the metal mold pieces (in this example, the metal mold piece 55) and is communication with the outer surface of the case and with the airtight space S formed inside the inner surface of the silicone rubber cover. A resin injecting section 72 in communication with the airtight space S is provided in the front portion of a pipe body 71 of the injection device 70.

The undiluted solution (liquid resin) of the super-soft resin 40 is injected into the airtight space S between the outer surface of the case 9 and the cover 20 from the pipe body 71 of the injection device 70 in a state where the vibrator body 2 coated with the silicone rubber cover 20 is accommodated and held in a cavity formed by molding concave portions 55a and 60a of the metal mold pieces (the molding pieces) 55 and 60.

In a state where the outer surface of the vibrator body 2 is coated with the silicone rubber cover 20, the peripheral edge of the case opening 9a and the peripheral edge of the cover opening 20a do not come into sufficient contact with each other, and the space S does not become the airtight space. As illustrated in FIGS. 6(a) and 6(b), the injection device 70 is attracted to the inner wall (the inner surface of the molding concave portion 55a) of the metal mold piece 55 and comes into press contact therewith by screwing and fastening the nut-like fastening device 80 to a male screw section 75a provided in the rear portion of the injection device 70 inserted into the opening. Therefore, the front portion of the injection device depresses the inner surface of the case toward the inner surface of the metal mold piece 55, and the peripheral edge of the cover opening 20a comes into press contact with and tightly fixed to the peripheral edge of the case opening 9a. As a result, the peripheral edge of the case opening 9a and the peripheral edge of the cover opening 20a are strongly fixed all over the peripheral therebetween so as to form the seal portion A, and the space S can be the airtight space.

After the molding is completed, the fastening device 80 is separated from the male screw section 75a, the injection device 70 is removed from the opening to open the metal mold, the metal mold is opened, and then a product can be taken out.

Two metal mold pieces 55 and 60, for example, are configured to be freely opened or closed by a hinge (not illustrated).

Further, the number of metal mold pieces forming the metal mold (molding space, cavity) does not need to be two. In other words, depending on the configuration of the massage appliance, only the metal mold piece 55 supporting the injection device is used (the metal mold piece 60 is not used), and the undiluted solution of the super-soft resin can be sufficiently injected into the airtight space. Therefore, at least one of the metal mold pieces may be used, and in a case where one metal mold piece is used, only a part of the silicone rubber cover is coated by the metal mold piece, and the remaining part is not covered.

In addition, three or more metal mold pieces may be combined to form one metal mold (the molding space).

In addition, a good sliding is obtained between the silicone rubber cover and the inner surface of the metal mold by forming (coating) a low-friction material layer such as Teflon (registered trademark) in the inner wall surface (a molding surface) of the metal mold forming the molding space, the extracting at the time of removal comes to be easy and it is possible to prevent contaminants from being attached to the silicone rubber cover.

In addition, FIGS. 7(a) and 7(b) are an inner surface view and a bottom plan view of one metal mold piece, and FIGS. 7(c), 7(d), and 7(e) are an inner surface view, a bottom plan view, and a longitudinal sectional view of the other metal mold piece.

In the inner surface (including the molding surface) of the metal mold piece on which the outer surface of the silicone rubber cover 20 of the massage appliance abuts, finely wide and deep grooves 90 (90a, 90b, and 90c) for air removal are formed at a predetermined pitch as illustrated in the drawing. Since an air layer (a lump of air) is formed between the molding surface of the metal mold and the silicone rubber cover 20 in the middle of injecting the super-soft resin, the groove 90 serves as a means for preventing deformation or a concave portion generated by being transferred with the shape of the air layer transferred onto the outer surface (and the inner super-soft resin) of the silicone rubber cover.

In other words, in a case where the molding surface and the silicone rubber cover form a completely airtight state when the metal mold is closed, the air left therein is collected to form a considerable bubble. When the inner super-soft resin is cured in a state where the bubble pushes the outer surface of the silicone rubber cover, a product with the deformation or the concave portion corresponding to the shape of the bubble is formed, resulting in a defective product.

The groove 90 includes a first groove 90a which is extended in a longitudinal direction passing through the center of the respective concave portions 55a and 60a (the molding surface), a plurality of second grooves 90b which are extended in a width direction intersecting with the first groove and in parallel to each other, and a third groove 90c which is formed in the external portion of the molding surface and is in communication with the grooves 90a and 90b. The third groove directly communicates with the external air. Therefore, even when the air remains in a gap formed between the molding surface and the silicone rubber cover, the air is efficiently extruded to the external portion of the metal mold from the third groove 90c through the first groove 90a and the second groove 90b by a pressure generated when the super-soft resin fills the space S.

In this way, in the present invention, the grooves 90 are formed in the molding surface and the inner surface of the other metal mold piece (the molding piece), and the end portion of the groove is in communication with the external portion of the metal mold (the molding member). With this configuration, the air likely to be left and sealed between the outer surface of the silicone rubber cover and the molding surface can be efficiently discharged and removed to the external portion using the pressure generated when the super-soft resin is injected into the space S. The number, the arrangement and the width of grooves 90 can be selected in various ways, and there is no problem as long as the width of the groove is so minute that the shape of the groove is not transferred.

Further, the groove 90 is not essential, and in a case where the molding having no deformation is possible even when the groove is not provided, the groove may be not necessary.

FIG. 8 is a diagram illustrating an external configuration of the injection device 70.

The injection device 70 includes the pipe body (an injection empty space) 71 which injects the undiluted solution of the super-soft resin into the airtight space S, and a resin exterior body (a positioning member) 75 which is integrally formed in the outer surface of the pipe body 71 to be positioned in the pipe body in the openings 56, 20a, and 9a. In this example, an elastic member 76 such as a flat spring is outwardly provided in the exterior body 75 and the elastic member 76 comes into press contact with the inner wall of each opening, so that the falling of the injection device from the inside of each opening and the positional deviation are prevented.

In addition, the male screw section 75a is formed in the outer surface of the exterior body 75, and the fastening device 80 formed with a female screw can be screwed to the male screw section 75a.

As illustrated in FIG. 6(b), in a state where the injection device 70 is inserted and positioned in the openings 56, 20a, and 9a, the end portion outside the pipe body 71 protrudes to the outside of the metal mold 53, a dispenser (not illustrated) for injecting the undiluted solution of the super-soft resin is connected to the end portion on the outside of the pipe body.

As illustrated in the drawing, the end portion inside the pipe body 71 is bent in an appropriate J shape, and the bent front end section serves as the resin injecting section 72 which injects the undiluted solution of the super-soft resin into the airtight space S. The resin injecting section 72 is inserted from the inner surface of the case into an injection hole 9b provided in the case 9, and enters a state where the end opening thereof is in communication with the inside of the airtight space S. Therefore, when the undiluted solution of the super-soft resin is injected from the end opening outside the pipe body 71, the resin fills the airtight space S from the resin injecting section 72. Since the peripheral edge of the case opening 9a and the peripheral edge of the cover opening 20a (the seal portion A) is tightly fixed with each other by the fastening device 80, the undiluted solution thus injected is prevented from being leaked out into the case through the opening.

Further, as the configuration of the injection device 70, the pipe body 71 and the exterior body 75 do not need to be separately configured, but may be formed as a single body configured with the same material such as resin or metal. In other words, the pipe body 71 as the injection empty space may be integrally provided in the inner portion of the exterior body 75 as the positioning member.

Further, before the undiluted solution of the super-soft resin is injected into the airtight space S, the airtight space is depressurized by a negative pressure introduced from the negative pressure introducing section 57. When the airtight space is depressurized, the inside of the cover 20 is evacuated and the cover is tightly fixed to the outer surface of the case.

The super-soft resin can be filled without forming the bubbles by injecting the undiluted solution of the super-soft resin into the airtight space in such a depressurized state.

Next, a state where the space S and the inside of the case are deaerated by the negative pressure from the negative pressure introducing section 57 will be described based on FIG. 9.

The case 9 is formed by making two case pieces 9A and 9B abut on and bond each other as illustrated in an enlarged view in FIG. 9, and a gap 9C is formed in the abutment portion.

In addition, the contact surface between the outer peripheral of the exterior body 75 of the injection device 70 and the inner peripheral of the opening 56 is sealed.

When the negative pressure from a vacuum pump is introduced from the negative pressure introducing section 57, the inner portion of the case is first depressurized through the gap between the outer peripheral surface of the injection device and each opening. Subsequently, the air in the space S is sucked from the gap 9C into the case, and finally all the air in the soft cover 20 is deaerated.

In this state, even when the suction by the vacuum pump is stopped, the inner portion of the soft cover can be kept in the deaerated state.

In this stage, the airtight space S is filled with the undiluted solution of the super-soft resin and enters a filling state by the undiluted solution. Further, since the gap 9C is formed so narrow that the air is passed and the undiluted solution having a viscosity higher than the air is not passed, the undiluted solution is not leaked out into the case.

Further, the super-soft resin cured after heating and drying can be easily removed by forming a Teflon (registered trademark) coating layer in a portion (such as the inner surface of the pipe body (the injection empty space) 71 of the injection device) in which the undiluted solution of the super-soft resin is passed and attached.

Further, the metal mold of the above embodiment has been described as the molding member, but the molding member may be formed in any shape or made of a material other than metal as long as a material contributes to the injection of the undiluted solution of the super-soft resin into the space S from the injection device by holding at least a part of the dual-structured cladding materials 20 and 40 having the case built therein.

Embodiment of Method for Manufacturing Massage Appliance

Next, a sequence of manufacturing the massage appliance of the present invention will be described.

The manufacturing method of the massage appliance 1 includes the following processes.

(1) A process of preparing the vibrator body 2 having the case 9 which includes the internal components (the motor 5, the battery 6, the printed-circuit board 7, and the vibrating piece 8) and the case opening 9a at least in a place, and has the case 9 accommodating the internal components.

The process may be performed after the final process in which a molding product is extracted from the inside of the metal mold.

(2) A process of preparing the silicone rubber cover (the soft cover) 20 including the cover opening 20a at a position corresponding to the case opening.

(3) A process of forming a unit which is coated with the silicone rubber cover 20 in the outer surface of the case 9 to make the case opening 9a and the cover opening 20a communicate with each other.

The hole previously formed in the case 9 is sealed using an adhesion tape or the like.

(4) A process of setting the unit obtained in Step (3) in the metal mold (the molding member).

The openings 20a and 9a of the silicone rubber cover and the case and the opening 56 of the metal mold piece (the molding piece) enter a communicated state.

(5) A process of inserting the injection device 70 into the respective openings 56, 20a, and 9a of the metal mold piece, the silicone rubber cover, and the case.

The resin injecting section 72 protruding from the end of the injection device 70 is set to be inserted into the injection hole 9b provided in the case 9.

(6) A process of fixing the injection device 70 to the metal mold 53 using the fastening device 80.

The airtight space S between the outer surface of the case and the inner surface of the silicone rubber cover is formed by air-tightly fixing the entire peripheral edge of the cover opening 20a all over the peripheral edge of the case opening 9a in the metal mold.

(7) A process of introducing a negative pressure into the airtight space S.

The negative pressure from the vacuum pump is introduced from the negative pressure introducing section 57 to depressurize the inside of the space S.

(8) A process of injecting a liquid resin which is the undiluted solution of the super-soft resin into the airtight space using the injection device.

Since the space S enters the depressurized (vacuum) state, the space is evenly filled with the liquid resin.

The super-soft resin (for example, the undiluted solution of a gel-like resin) is injected from the dispenser into the pipe body 71.

Further, at the time of injecting the undiluted solution, or after the undiluted solution is injected, the metal mold may be vibrated to promote the bubbles likely to be left in the space S to be discharged, or to collect a small amount of the bubbles likely to be left at one point. In the latter case, the bubbles may be left at one point in the gel-like resin of the complete product, but there is no problem in the effect of the massage appliance since the amount of the bubbles is small. In particular, in a case where the left bubbles are disposed at positions in a portion of the vibrating section 1B or the grasping section 1A except the place where the fingers abut, there is no problem.

(9) A process of curing the liquid resin to be the super-soft resin.

Even depending on a material of the liquid resin, the undiluted solution is cured by a scheme such as heating and drying to be a gel phase or a super-soft phase. In this example, the undiluted solution of the gel-like resin is heated (dried) at 70° C. for 10 minutes to be cured so as to be the gel phase.

(10) A process of releasing the engagement of the fastening device 80 after the metal mold 53 is opened and separating the injection device 70 from the opening 56 of the metal mold 53.

(11) A process of extracting a molding product from the inside of the metal mold.

By performing these processes, the entire peripheral edge of the cover opening 20*a* is tightly fixed all over the peripheral edge of the case opening 9*a*, so that the airtight space S can be formed between the outer surface of the case and the inner surface of the silicone rubber cover, and after the space is evacuated, the super-soft resin can be injected.

Further, it is not essential to insert the injection device into the vibrator body from the opening of the metal mold. For example, the super-soft resin may be inserted by inserting the injecting section of a syringe-like dispenser (the injection device) into the space S of the vibrator body through the opening of the metal mold.

In other words, the positioning member having an arbitrary shape is inserted into the opening of the vibrator body from the opening of the metal mold, and the male screw section provided in the positioning member is engaged by the fastening device, so that the vibrator body comes into press contact with the inner wall of the metal mold through the positioning member. Therefore, the entire peripheral edge of the cover opening 20*a* is tightly fixed all over the peripheral edge of the case opening 9*a*, and the airtight space (space) S is formed between the outer surface of the case and the inner surface of the silicone rubber cover. In this state, the airtight space is depressurized, and the resin may be injected into the airtight space by the syringe-like dispenser. As a method of injecting the resin by the dispenser, a method of pricking and injecting the outer surface of the soft cover with a needle-like injecting section of the dispenser may be employed.

In addition, depending on the shape of the massage appliance as a product, the space S may be completely filled with the undiluted solution of the super-soft resin only by the injection into the space S by the injection device without using the metal mold. In other words, in a case where shape retention of the silicone rubber cover covering on the outer surface of the case is sufficient, a target shape can be obtained only by filling the space with the undiluted solution even when the external shape is not held by the metal mold.

Therefore, the metal mold is not essential.

Furthermore, depending on the shape of the massage appliance as a product or the shape of the silicone rubber cover, the filling with the undiluted solution may be possible without introducing the negative pressure into the space S. In other words, the process of introducing the negative pressure may be omitted.

Modification of Massage Appliance

Next, FIG. 10 is a perspective view illustrating the outer appearance of the massage appliance according to another embodiment of the present invention, in which (a) is a front side perspective view and (b) is a perspective view illustrating the rear surface side.

The massage appliance 1 has almost the same massage appliance and the same inner structure according to the embodiment except that the outer appearance is a rod shape. The massage appliance 1 is configured such that both end portions are formed in a cylindrical shape faceted in a spherical shape, a side provided with the lid member 15 including switches 16 and 17 is the grasping section 1A, and the other end section is the vibrating section 1B.

In other words, the massage appliance 1 includes the vibrator body 2 which accommodates the motor 5, the printed-circuit board 7, the battery 6, and the vibrating piece 8 in the case 9, the super-soft resin 40 which is stacked to cover at least a part of the outer surface of the vibrator body, and the silicone rubber cover 20 which covers the outer surface of the super-soft resin 40 (see FIGS. 3 and 4).

FIG. 11(*a*) is a cross-sectional view illustrating a configuration of an apparatus to manufacture the massage appliance 1 according to the embodiment. Basically, the apparatus includes the similar configuration of the manufacturing apparatus illustrated in FIGS. 6 and 7 except that the shape of the metal mold (in particular, the shape of the molding surface) is different. Therefore, the same portions as those of FIGS. 6 and 7 are denoted with the same symbols, and the redundant description will not be made.

Next, in the metal mold 53 of FIG. 11(*b*), only using the metal mold piece 55, the super-soft resin is injected and a product is molded.

In this way, the injection and the molding of the super-soft resin using the metal mold 53 are not necessarily performed in a state where the product is sealed in the inner portion by the plurality of metal mold pieces.

As illustrated in the drawing, the other metal mold piece is not necessary as long as the shape of the product face on a side not held by the metal mold piece can be kept by injecting the undiluted solution of the super-soft resin 40 to the space between the case and the silicone rubber cover in a state where the product is fixed to the metal mold piece 55 which holds the injecting device 70.

Further, even in the manufacturing apparatus of FIG. 6(*b*), the metal mold piece 60 is not essential. The other metal mold piece 60 is not necessary as long as the shape of the product face on a side not held by the metal mold piece 55 can be kept.

Modification of Massage Appliance

FIG. 12 is a perspective view illustrating the outer appearance of the massage appliance 1 according to the embodiment, and FIGS. 13(*a*) and 13(*b*) are a longitudinal sectional view and an exploded sectional view of the massage appliance.

The massage appliance 1 includes the motor 5, the battery 6, the vibrating piece 8 which is rotatably driven by the motor, and the vibrator body 2 which includes the case 9 accommodating these internal components, the silicone rubber cover (the soft cover) 20 which surrounds the outer surface of the case 9, the super-soft resin (for example, the urethane super-soft resin, the gel-like resin, or the like) 40 which is interposed between the outer surface of the case and the silicone rubber cover and integrates the case and the silicone rubber cover.

The massage appliance 1 includes the grasping section 1A and the vibrating section (the vibrator body) 1B, and the grasping section and the vibrating section are configured to freely attached or removed by a screwing section 90 which includes a female screw section 90*a* and a male screw section 90*b*.

The entire shape of the massage appliance is a cylindrical shape, and the vibrating section 1B is formed in a spherical shape.

The cladding material of the dual structure is provided in a portion except the grasping section 1A. Therefore, in the example, the grasping section 1A is made of a plastic material similarly to the case 9.

An apparatus and a method of filling the space between the case 9 of the massage appliance and the silicone cover 20 with the undiluted solution of the super-soft resin 40 are similar to the respective embodiments.

However, the soft cover is previously coated on the outer surface of the case of the vibrating section 1B in a state where the motor and the vibrating piece are unassembled, and then the space S may be filled with the super-soft resin using the injection device. In the inner portion of the case configured as described above, the motor and the vibrating piece may be sequentially assembled. At this time, the metal mold may be used as needed. In short, an order of assembling the motor and the vibrating piece has a room for being variously changed.

Alternatively, the soft cover having a shape matching the outer surface of the case of the vibrating section 1B is prepared, and the dual-buffered cover formed with a resin layer made of the super-soft resin is separately manufactured in the inner surface of the soft cover. The outer surface of the case forming the vibrating section may be coated with the dual-buffered cover. The motor, the vibrating piece, and the like may be assembled in the case at any stage.

Further, in such a case, the super-soft resin and the soft cover may not be integrated with respect to the case. However, since the super-soft resin has a strong frictional resistance with respect to the case, there is no positional deviation and no separation. Alternatively, the case and the super-soft resin may be integrated using an adhesive as needed.

Summary of Configuration, Operation, and Effect of Present Invention

The massage appliance of the present invention includes the motor, the vibrating piece which is rotatably driven by the motor, and the vibrator body which includes the case accommodating these components, the soft cover which surrounds the outer surface of the case, and the super-soft resin which is interposed between the outer surface of the case and the soft cover and integrates the case and the soft cover.

Since the soft cover having a low frictional resistance through a layer made of the super-soft resin is fixed to the outer surface of the case, the outer surface of the case is covered by the cladding material of the dual structure having a high flexibility. Therefore, the stimulation caused by the vibration of the vibrating piece driven by the motor can be buffered, reduced, and dispersed by the cooperation between the soft cover and the super-soft resin, and it is possible to reduce a pain or an uncomfortable feeling when the outer surface of the soft cover is brought in contact with the body's skin to apply the vibration. In particular, the massage effect can be exerted without enduring the pain or the uncomfortable feeling when massaging an eye, an ear, a nose, a head, a cervical portion, a stiff or painful body part, and other sensitive body parts to promote the bloodstream or removing the body wastes.

In addition, it is possible to exert a sound deadening effect and a sound damping effect of the dual buffering structure which is made of the super-soft resin and a soft resin such as a silicone material.

In addition, by covering not only the vibrating section but also the entire apparatus with the dual-structured cladding material having flexibility, the sliding of user's fingers and touch feeling are enhanced, a use feeling is kept without a tired feeling, finger's numbness, and an discomfort feeling, and a vibrating sound can be damped.

As described above, in a handy type and small-sized massage appliance of the present invention, the original massage effect such as the promotion of bloodstream, the removal of the body wastes, recovery from fatigue can be exerted without giving damage on a sensitive diseased part or the skin by covering the vibrating section which is brought in contact with the user's skin and applies vibration with the dual-buffered cladding material having high flexibility.

In addition, by covering not only the vibrating section but also the entire apparatus with the dual-buffered cladding material having high flexibility, the sliding of user's fingers is enhanced to keep a use feeling and a contact feeling without an uncomfortable feeling and a discomfort feeling such as a user's finger's numbness.

Next, the manufacturing method of the massage appliance of the present invention includes preparing the vibrator body, preparing the soft cover which includes the cover opening at a position corresponding to the case opening, coating the soft cover on the outer surface of the case to make the case opening communicate with the cover opening, forming the airtight space between the outer surface of the case and the inner surface of the soft cover to tightly fix the peripheral edge of the cover opening over the entire peripheral of the peripheral edge of the case opening, introducing the negative pressure into the airtight space, injecting the undiluted liquid resin of the super-soft resin into the airtight space, and curing the liquid resin to serve as the super-soft resin.

In order to fill the space between the outer surface of the case and the soft cover with super-soft resin without generating the bubbles, the peripheral edge of the cover opening is tightly fixed over the entire peripheral of the peripheral edge of the case opening and the inner portion of the space is depressurized.

Next, the manufacturing apparatus to perform the manufacturing method of the massage appliance of the present invention includes the metal mold which accommodates the case (the vibrator body) coated with the soft cover, is made of at least two metal mold pieces, and includes the metal mold opening communicating with the opening in the metal mold piece, the injection device of which the front portion is inserted and attached to the case opening through the metal mold opening and the cover opening and the rear portion is positioned outside the metal mold, the fastening device which fixes the rear portion of the injection device to the metal mold and tightly fixes the peripheral edge of the cover opening over the entire peripheral of the peripheral edge of the case opening, and a negative pressure introducing section which is formed to pass through any one of the metal mold pieces and communicates with the airtight space between the outer surface of the case and the inner surface of the soft cover, and a resin injecting section which communicates with the inner portion of the airtight space is provided in the front portion of the injection device.

In order to fill the space between the outer surface of the case and the soft cover with the super-soft resin without generating the bubbles, first, the injection device inserted in each opening is engaged with the metal mold piece by the fastening device so that the peripheral edge of the opening of the soft cover is interposed by the case and the inner wall of the metal mold. Therefore, the peripheral edge of the cover opening can be tightly fixed over the entire peripheral of the peripheral edge of the case opening. Thereafter, the undiluted solution of the super-soft resin is injected after the space is depressurized.

Further, the bubbles likely to be left in the super-soft resin may be promoted to be discharged or a small amount of bubbles may be shifted to a portion in which no problem occurs in the function of the massage appliance by vibrating the metal mold during a period when the undiluted solution of the super-soft resin is injected or after the injection.

Next, the injection device includes the injection empty space which is used to inject the super-soft resin into the airtight space and the positioning member which includes the injection empty space therein.

The positioning member is engaged to the metal mold by the fastening device, and thus the peripheral edge of the cover opening can be tightly fixed over the entire peripheral of the peripheral edge of the case opening.

REFERENCE SIGNS LIST

1 . . . massage appliance, 1A . . . grasping section, 1B . . . vibrating section, 2 . . . vibrator body, 5 . . . motor, 7 . . . printed-circuit board, 6 . . . battery, 8 . . . vibrating piece, 9 . . . case, 9a . . . case opening, 9b . . . injection hole, 15 . . . lid member, 16, 17 . . . operation switch, 20 . . . silicone rubber cover (soft cover), 20a . . . cover opening, 40 . . . super-soft resin, 50 . . . manufacturing apparatus, 53 . . . metal mold (molding member), 55, 60 . . . metal mold piece (molding piece), 55a . . . molding concave portion, 56 . . . metal mold opening (molding member opening), 57 . . . negative pressure introducing section, 70 injection device, 71 . . . pipe body, 72 . . . resin injecting section, 75 . . . exterior body, 75a . . . male screw section, 76 . . . elastic member, 80 . . . fastening device

The invention claimed is:

1. A manufacturing method of a massage appliance comprising:
    providing a motor, a vibrating piece configured to be driven by the motor, and a case configured to accommodate the motor and the vibrating piece and including a case opening at least in one place;
    accommodating the motor and the vibrating piece in the case;
    preparing a soft cover which includes a cover opening at a position corresponding to the case opening, the soft cover configured to surround an outer surface of the case;
    coating the soft cover on the outer surface of the case to make the case opening communicate with the cover opening;
    forming a space between the outer surface of the case and an inner surface of the soft cover by tightly fixing a peripheral edge of the cover opening over the entire peripheral of a peripheral edge of the case opening;
    introducing a negative pressure into the space;
    injecting a liquid resin as an undiluted solution of a soft resin into the space, the soft resin being interposed between the outer surface of the case and the soft cover, and being of a material which is more flexible than the soft cover, and being thicker than the soft cover; and
    curing the liquid resin to become the soft resin.

2. A manufacturing method of a massage appliance, comprising:
    providing a motor, a vibrating piece configured to be driven by the motor, and a case configured to accommodate the motor and the vibrating piece and including a case opening at least in one place;
    accommodating the motor and the vibrating piece in the case;
    preparing a soft cover which includes a cover opening at a position corresponding to the case opening, the soft cover configured to surround an outer surface of the case;
    coating the soft cover on the outer surface of the case to make the case opening communicate with the cover opening;
    forming a space between the outer surface of the case and an inner surface of the soft cover by tightly fixing a peripheral edge of the cover opening over the entire peripheral of a peripheral edge of the case opening;
    injecting a liquid resin as an undiluted solution of a soft resin into the space, the soft resin being interposed between the outer surface of the case and the soft cover, and being of a material which is more flexible than the soft cover, and being thicker than the soft cover; and
    curing the liquid resin to become the soft resin.

3. A manufacturing method of a massage appliance, comprising:
    providing a motor, a vibrating piece configured to be driven by the motor, and a case configured to accommodate the motor and the vibrating piece and including a case opening at least in one place;
    preparing a soft cover which includes a cover opening at a position corresponding to the case opening, the soft cover configured to surround an outer surface of the case;
    coating the soft cover on the outer surface of the case to make the case opening communicate with the cover opening;
    forming a space between the outer surface of the case and an inner surface of the soft cover by tightly fixing a peripheral edge of the cover opening over the entire peripheral of a peripheral edge of the case opening;
    injecting a liquid resin as an undiluted solution of a soft resin into the space, the soft resin being interposed between the outer surface of the case and the soft cover, and being of a material which is more flexible than the soft cover, and being thicker than the soft cover;
    curing the liquid resin to become the soft resin; and
    accommodating the motor and the vibrating piece in the case.

4. A manufacturing apparatus for manufacturing a massage appliance, comprising:
    a molding member being made of at least one molding piece and including a molding member opening, the molding member configured to hold a case coated with a soft cover, the molding member opening configured to communicate with a case opening and a soft cover opening in the at least one molding piece, wherein the case accommodates a motor and a vibrating piece configured to be driven by the motor, wherein the soft cover is configured to surround an outer surface of the case;
    an injection device of which a front portion is inserted and attached to the case opening through the molding member opening and the cover opening and a rear portion is positioned outside the molding member;
    a fastening device configured to fix the rear portion of the injection device to the molding member and tightly fix a peripheral edge of the cover opening over the entire peripheral of a peripheral edge of the case opening, thereby forming a space between the outer surface of the case and an inner surface of the soft cover;

a negative pressure introducing section configured to be formed to pass through the molding member and communicate with the space between the outer surface of the case and the inner surface of the soft cover to introduce a negative pressure into the space; and a resin injecting section, provided in the front portion of the injection device to communicate with the space, configured for injecting a liquid resin as an undiluted solution of a soft resin into the space, whereby the liquid resin is then cured to become the soft resin and resulting in the soft resin being interposed between the outer surface of the case and the soft cover, and being of a material which is more flexible than the soft cover, and being thicker than the soft cover.

5. The manufacturing apparatus according to claim 4, wherein the resin injecting section includes an injection empty space which is used to inject the soft resin into the space between the outer surface of the case and an inner surface of the soft cover, and a positioning member which includes the injection empty space.

\* \* \* \* \*